United States Patent [19]
Bucher

[11] 3,758,173
[45] Sept. 11, 1973

[54] KNIFE EDGE BEARING FOR BALANCE BEAM

[75] Inventor: Hans Bucher, Galgnen, Switzerland

[73] Assignee: Mettler Instruments AG, Greifensee-Zurich, Switzerland

[22] Filed: Mar. 14, 1972

[21] Appl. No.: 234,505

[30] Foreign Application Priority Data
Aug. 26, 1971 Switzerland.................. 12506/71
Jan. 18, 1972 Switzerland..................... 701/72

[52] U.S. Cl. ......................... 308/2 R, 177/DIG. 9
[51] Int. Cl. ............................................. F16c 11/00
[58] Field of Search ...................... 308/2 R, 2 A; 177/DIG. 9; 74/527

[56] References Cited
UNITED STATES PATENTS

| | | | |
|---|---|---|---|
| 3,103,390 | 9/1963 | Hale | 308/2 R |
| 3,096,839 | 7/1963 | Mastright | 308/2 R |
| 1,071,761 | 9/1913 | Leake | 308/2 R |
| 599,245 | 2/1898 | Merrill | 74/527 |
| 3,413,044 | 11/1968 | Weickhardt | 308/2 R |
| 2,348,292 | 5/1944 | Gross | 74/527 |
| 2,716,352 | 8/1955 | Wilson | 74/527 |

FOREIGN PATENTS OR APPLICATIONS
58,734 11/1953 France ..................... 177/DIG. 9

Primary Examiner—Charles J. Myhre
Assistant Examiner—R. H. Lazarus
Attorney—Kurt Kelman et al.

[57] ABSTRACT

The knife edge member of the bearing for a balance beam has two notches in its edge. A fixed abutment on the bearing seat is received with sufficient clearance in one notch to permit only limited movement of the knife edge member on the bearing seat in the direction of its pivot axis, and a conical end portion of a stop is received in the second notch. The stop is adjustable on the bearing seat at right angles to the pivot axis inward and outward of the second notch to permit engagement of the end portion with the rim of the second notch even after wear of the respective contact surfaces, and a helical compression spring yieldably opposes displacement of the end portion of the stop and of the engaged knife edge member from an axial position on the bearing seat in which the abutment is approximately centered in the first notch.

8 Claims, 3 Drawing Figures

KNIFE EDGE BEARING FOR BALANCE BEAM

This invention relates to knife edge bearings for balances, and particularly to a bearing arrangement for a balance beam and like pivotable member of a balance in which the balance member is held in a predetermined position along the pivot axis.

The invention will be described hereinafter with reference to the beam of an inclination balance in which the angular position of the beam is indicated by the relative position of indicia on the beam and an index mark on the stationary balance frame which are projected on a screen by a light source and an associated optical system. If the beam shifts along its pivot axis, the indicia may move out of focus of the optical system, and their blurred projected image cannot be read precisely.

It has been proposed to employ cooperating abutments on the knife edge member and on the balance frame to prevent axial shifting of the balance beam, but the relative position of the abutments may be altered sufficiently by changes in ambient temperature and differential thermal expansion or contraction of the supporting elements to make the abutments of limited value. If sufficient clearance is provided at one temperature to prevent binding of the abutments at another temperature, the axial position of the beam may not be maintained at the first-mentioned temperature. To provide the minimum permissible clearance requires workmanship of high precision and is correspondingly costly.

It has been proposed in German Patent No. 1,295,873 and Japanese Patent No. 314,561 to provide notches in the edge of the knife edge member and to have the notches engaged by rounded or conical stops fixed on the bearing seat. Such arrangements are immune to temperature variations. However, to be effective, they require the high precision and costly labor referred to above. Moreover, they are fully effective only when new and deteriorate by wear.

It has now been found that the shortcomings of the known stop arrangements can be avoided by mounting a stop on the bearing set for adjustment of a tapering end portion inward and outward of the associated notch transversely of the pivot axis of the knife edge member, and to provide means for arresting the stop in the adjusted position. In this bearing arrangement, relative wide tolerances are permissible in the dimensions of the notch and of the stop, and the effects of wear can be compensated by a simple adjustment of the stop.

Other features, additional objects, and many of the attendant advantages of this invention will readily be appreciated as the invention becomes better understood by reference to the following detailed description of preferred embodiments when considered with the appended drawing in which.

Figure 1:
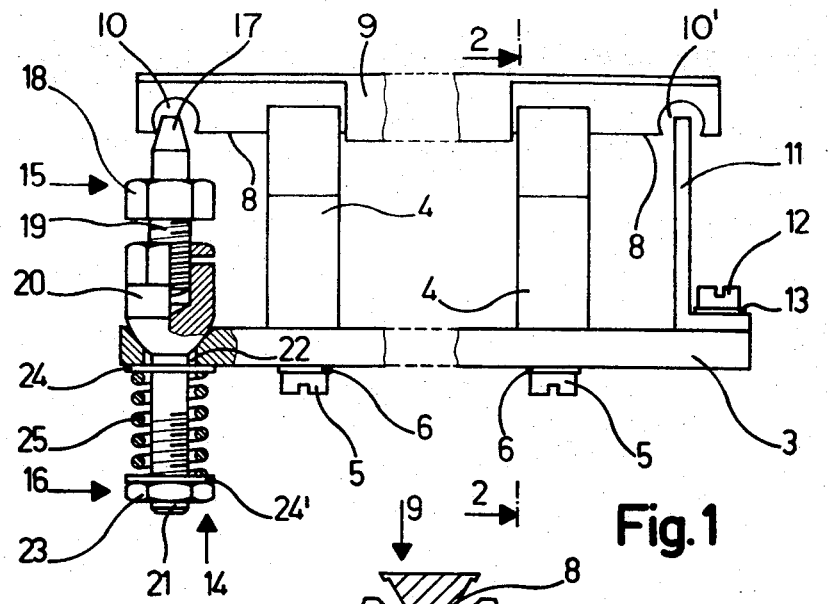
FIG. 1 is a fragmentary, elevational, and partly sectional view of a bearing arrangement of the invention.

Referring now to FIG. 1, there is shown only as much of an inclination balance equipped with a bearing arrangement of the invention as is needed for an understanding of the latter, the balance being otherwise conventional.

Figure 2:
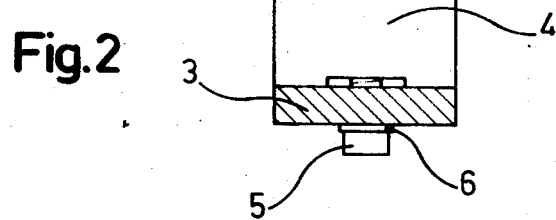
FIG. 2 shows the device of FIG. 1 in section on the line 2—2.

The bearing seat assembly includes a bracket 3 which may be an integral part of the stationary balance frame, not otherwise shown. Two mounting seats 4 are spaced on the bracket 3 to which they are fixedly attached by means of screws 5 and washers 6. They each form a V-shaped receptacle 7, best seen in FIG. 2. The aligned receptacles 7 receive respective ground and honed portions 8 of an elongated knife edge member 9 for movement of the latter about a pivot axis perpendicular to the plane of FIG. 2 and longitudinal of the member 9.

The ground portions 8 are formed with respective recesses or notches 10, 10' near the longitudinal ends of the knife edge member 9. The notches are formed by drilling passages in the blank of the knife edge member prior to grinding the portions 8. Enough of the blank is grounded away to leave the notches 10, 10' open in a direction transverse to the pivot axis over an arc of about 75° of their circumference. The notches thus flare inward of the rims of their respective orifices.

An L-shaped piece 11 of heavy sheet metal has a short leg fixedly attached to the bracket 3 by means of a screw 12 and washer 13. The free end of the longer leg extends into the notch 10', its width being about one third of the corresponding dimension of the notch orifice, as is shown in FIG. 1. The sheet metal piece 11 provides an abutment sufficiently rigid to limit longitudinal movement of the knife edge member 9 by engagement with the rim of the notch 10'.

The notch 10 cooperates with a resilient, adjustable stop 14 essentially consisting of two coaxial pins 15, 16. The pin 15 is made of steel, and its axial end portion 17 remote from the pin 16 is hardened and ground conically to an apex angle of slightly more than 15°. It is received with minimal clearance in the orifice of the notch 10. The enlarged central portion 18 of the pin 15 is of hexagonal shape for engagement by an open-end wrench.

The lower end portion 19 is threaded and conformingly received in an internally threaded enlarged upper end portion or head 20 of the pin 16 which is of partly hexagonal shape. The stem 21 of the pin 16 passes through a bore 22 of the bracket 3 with ample clearance, and its externally threaded free end carries a nut 23. Two washers 24, 24' on the stem 21 are held in abutting engagement with the nut 23 and the underside of the bracket 3 respectively by an interposed helical compression spring 25 coiled about the stem 21.

The bore 22 flares conically in an upward direction, and a portion of the head 20 in the bore 22 flares in the same direction. The surface of the head 20, however, is not conical but more closely similar to that of an ellipsoid of rotation so that contact between the head 20 and the flaring bore portion is limited substantially to a circular line in the illustrated position of the stop 14. The contact pressure between the head 20 and the wall of the bore 22 is determined by the spring 25 and may be varied by turning the nut 23, and thereby compressing or loosening the spring. The stop 14 thus may pivot in the bore 22 in the plane of FIG. 1, that is, in the direction of the pivot axis of the knife edge member, and is biased toward the illustrated position by the spring 25.

Wrenches applied to the central portion 18 and to the head 20 permit the two pins 15, 16 to be moved axially relative to each other, thereby to move the pin 15 longitudinally into and out of the notch 10. The pitch of the engaged threads on the lower pin portion 19 and the head 20 is small enough to lock the two pins against relative angular movement about the common axis under applied axial stresses, and thereby to arrest the conical end portion 17 in the adjusted position when the non-illustrated wrenches are removed. The pitch of the threads on the stem 21 and the nut 23 is similarly chosen.

The central portion of the knife edge member and the balance beam fixedly attached thereto have been broken away in the view of FIG. 1 since they are entirely conventional in themselves. One arm of the beam carries a glass plate in which an arcuate scale centered in the pivot axis of the knife edge member 9 is engraved, as is well known and not illustrated. An optical system passes light through the engraved plate in a direction parallel to the plane of FIG. 1 to project an image of the scale and of a fixed reference line on a screen. Precise focusing of that image is ensured by the stop 14 which engages the rim of the notch 10, tends to hold the knife edge member 9 in the illustrated position, and returns the member 9 to this position if it should be moved in the direction of its pivot axis against the restraint of the spring 25. Such axial movement is limited by the abutment 11 to prevent the ground portions 8 from leaving the receptacles 7 if the balance should be jarred accidentally. The resiliency of the stop 14 prevents damage that could result with a more rigid connection between the knife edge member 9 and the bearing seat assembly.

Figure 3:
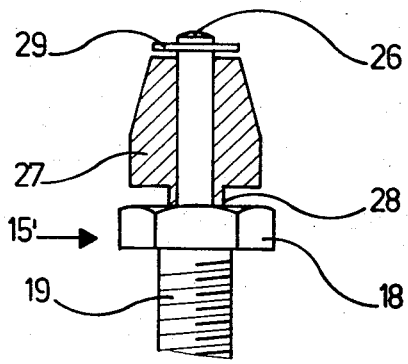
FIG. 3 shows a modified detail of the apparatus of FIG. 1 in a corresponding view on a larger scale.

As is inherent in the triangular cross section of the ground portions 8, the rim of the notch 10 engages the conical end portion 17 of the pin 15 in a point or in a very small area so that the contact pressure is high even when only small forces tend to shift the knife edge member in an axial direction, and wear of the conical portion 17 is unavoidable even though it is preferably made of hardened steel, as mentioned above. Such wear can be compensated by threadedly moving the pin 15 on the pin 16 inward of the notch. The useful life of the pin 15, however, can be increased greatly by the modification illustrated in FIG. 3.

The pin 15' is identical with the pin 15 as far as not shown or described otherwise. Its lower end portion 19 is threaded for engagement with the pin 16, not itself seen in FIG. 3, and its center portion 18 is hexagonal for engagement by a wrench. The integral top portion 26 of the pin 15' is a slender cylindrical shaft coaxial with the lower end portion 19. A generally frustoconical contact element 27 is mounted on the shaft 26 with merely enough clearance to permit free rotation of the element 27. The part 28 of the element 27 nearest the center portion 18 is greatly reduced in diameter and cylindrical so as to reduce friction between the element 27 and the portion 18 that could interfere with rotation of the element 27. The element is axially secured on the shaft 26 by a spring clip 29 partly received in a circumferential groove of the shaft which is obscured in the view of FIG. 3.

The pin 14 is free to pivot not only in the plane of FIG. 1, but also at right angles thereto. The forces exerted by the rim of the notch 10 on the contact element 27 thus have not only a component radial relative to the axis of the shaft 26, but also a circumferential component which tends to turn the contact element. Wear of the element is thus distributed over its circumference and not concentrated in two small areas as is inherent in the end portion 17 integral with the remainder of the pin 15. Wear of the rim of the notch 10 is readily compensated by lengthening the stop 14, and thereby moving the contact element 27 deeper into the notch.

In actual embodiments of the bearing arrangement shown in the drawing, the axial movement of a knife edge member and of the balance beam mounted thereof has readily been limited by the abutment 11 to a distance within the depth of focus of the optical system employed so that sharp images of the non-illustrated scale on the beam were obtained at all times.

Tests have shown that the use of an antifriction bearing, such as a ball bearing, between the contact element 27 and the shaft 26 is not normally necessary, but such a refinement and similar minor modifications of the apparatus shown and described may readily be resorted to by those skilled in the art.

It should be understood, therefore, that the preceding disclosure relates only to preferred embodiments of the invention, and that it is intended to cover all changes and variations in the examples of the invention chosen hereinabove for the purpose of the disclosure which do not constitute departures from the spirit and scope of the appended claims.

What is claimed is:

1. A bearing arrangement for a balance comprising, in combination:
   a. a bearing seat assembly defining a receptacle;
   b. a knife edge member having an elongated edge portion engaging said assembly in said receptacle for pivoting movement about a longitudinal axis,
      1. said knife edge member being formed with a recess open in a direction transverse to said axis;
   c. a stop member having two end portions, one end portion being received in said recess and tapering in said transverse direction;
   d. mounting means movably securing the other end portion of said stop member to said assembly, said mounting means including
      1. yieldably resilient means biasing said stop member toward a predetermined axial position of said one end portion and opposing axial movement of said one end portion away from said predetermined position; and
   e. adjusting means for adjusting said one end portion in said transverse direction relative to said assembly and for arresting said stop member in the adjusted position.

2. An arrangement as set forth in claim 1, wherein said yieldably resilient means include a helical compression spring.

3. An arrangement as set forth in claim 2, wherein said assembly is formed with an opening, said other end portion is pivotally received in said opening, and said spring is interposed between said assembly and said other end portion.

4. An arrangement as set forth in claim 1, further comprising abutment means fixed on said assembly for limiting said axial movement.

5. An arrangement as set forth in claim 4, wherein said knife edge member is formed with an additional recess open in said transverse direction, said abutment means including an abutment member fixedly fastened to said assembly and received in said additional recess with a clearance sufficient to permit said axial movement to a limited extent.

6. An arrangement as set forth in claim 1, wherein said mounting means pivotally secures said other end portion to said assembly, said yieldably resilient means opposing pivotal movement of said other end portion.

7. An arrangement as set forth in claim 6, wherein said one end portion is substantially conical.

8. An arrangement as set forth in claim 6, wherein said knife edge member has a rim bounding the open side of said recess, said mounting means including means for adjusting said stop member in said transverse direction until said one end portion engages said rim, said one end portion being of circular cross section about an akis extending in said transverse direction and free to rotate about the axis thereof.

* * * * *